Figure 1:
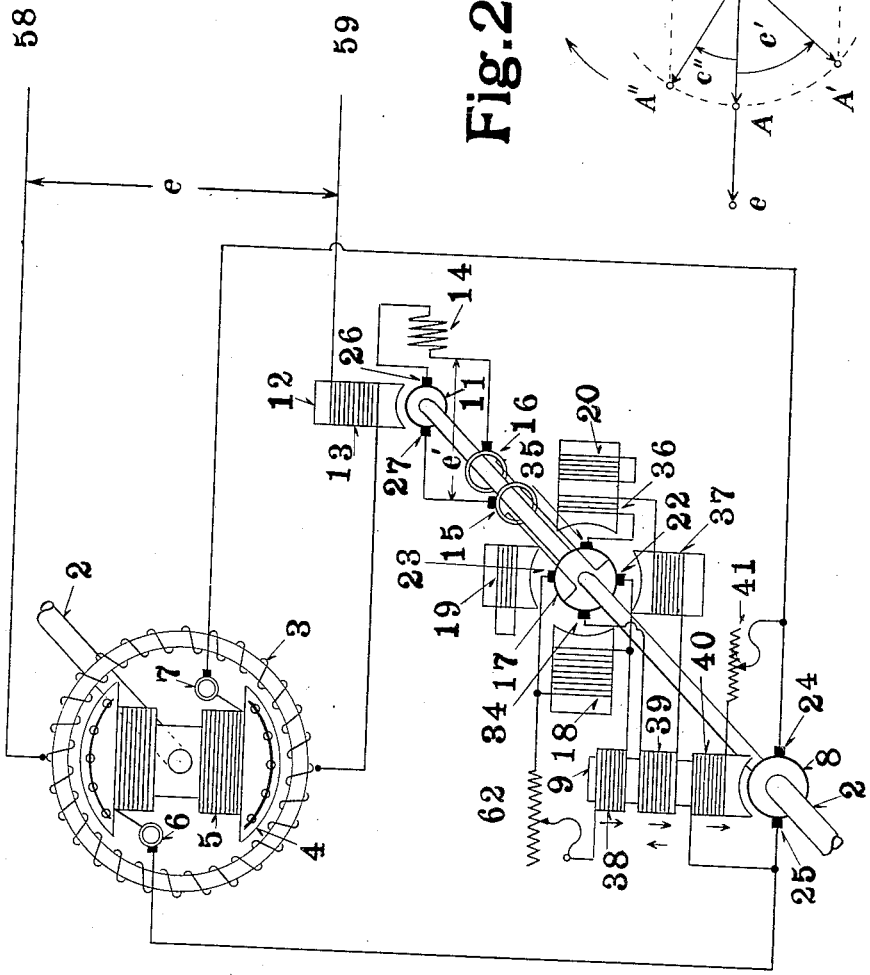

V. A. FYNN.
DYNAMO ELECTRIC MACHINE.
APPLICATION FILED JULY 2, 1917.

1,354,901.

Patented Oct. 5, 1920.
2 SHEETS—SHEET 1.

WITNESS
W. A. Alexander

INVENTOR.
Valère A. Fynn
BY
E. E. Huffman
ATTORNEY.

V. A. FYNN.
DYNAMO ELECTRIC MACHINE.
APPLICATION FILED JULY 2, 1917.

1,354,901.

Patented Oct. 5, 1920.
2 SHEETS—SHEET 2.

Fig. 3.

WITNESS
W H Alexander

INVENTOR.
Valère A Fynn
BY
E E Huffman
ATTORNEY.

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,354,901.  Specification of Letters Patent.  Patented Oct. 5, 1920.

Application filed July 2, 1917. Serial No. 178,063.

*To all whom it may concern:*

Be it known that I, VALÈRE A. FYNN, a subject of the King of England, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to alternate current generators or motors and has for its object to automatically vary the current supplied to the exciting member in accordance with variation in the direction and magnitude of that component of the armature reaction which is coaxial with the exciting field, or to vary said current in the manner stated and also in accordance with variation in direction and magnitude of that component of the armature reaction which is displaced by 90 electrical degrees from the axis of the exciting field. In this manner I can neutralize the armature reaction in such machines for any phase relation between the load current and the terminal voltage. When applied to generators this invention serves to reduce the variation of the terminal voltage with varying load substantially to that due to the impedance drop in the machine. This impedance drop can be eliminated by suitably compounding the machine. When applied to motors it affects the power factor of the machine.

In one embodiment of my invention as applied to a synchronous generator I provide the machine with a winding on its exciting member capable of magnetizing along one axis per pole, supply an exciting current to this winding sufficient to produce the necessary no-load magnetization and cause said current to vary with the magnitude and direction of that component of the armature reaction which is coaxial with the winding on the exciting member.

In another embodiment of my invention as applied to the same type of machine I provide the exciting member with an exciting winding and with a neutralizing winding displaced by 90 electrical degrees from the exciting winding, supply to the exciting winding an exciting current sufficient to produce the necessary no-load magnetization, cause said current to vary with the magnitude and direction of that component of the armature reaction which is coaxial with the exciting winding and supply to the neutralizing winding a current varying with the magnitude and direction of that component of the armature reaction which is at right angles to the exciting winding.

In either case I generate an alternating E. M. F. proportional to the load current and having a fixed phase relation to said current. I impress this E. M. F. on the alternating current side of a rotary converter which is driven at a synchronous speed independently of the alternating current E. M. F. impressed on it, and I so position brushes to coöperate with the direct current end of the machine as to obtain a direct current E. M. F. which varies with the sine of the phase angle between the load current and the terminal E. M. F. of the synchronous generator, or so as to obtain one direct current E. M. F. which varies as stated and another which varies with the cosine of the phase angle between the load current and the terminal E. M. F. This arrangement is believed to be broadly novel and is capable of applications other than those specifically described in this specification.

Figure 2:
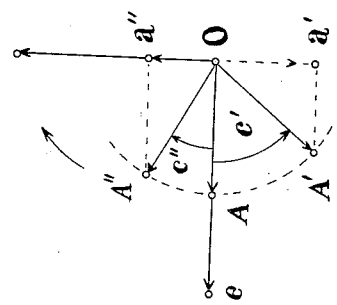

My invention will be better understood by reference to the accompanying drawings, in which Figure 1 shows the invention as applied to a single-phase dynamo electric machine the exciting member of which carries an exciting winding only. Fig. 3 illustrates another embodiment as applied to a dynamo electric machine the exciting member of which carries an exciting and a neutralizing winding. Fig. 2 is an explanatory diagram.

Referring to Fig. 1, the no-load excitation of the single-phase two-pole synchronous generator there shown, is provided by means of an ordinary direct-current exciter, and this excitation is modified in accordance with the magnitude and the phase of an E. M. F. varying in magnitude with the load current and retaining throughout a fixed phase relation with respect to said current. The synchronous alternator carries a winding 3 disposed on the stator and connected to the mains 58, 59. The field structure 4 of this machine is keyed to the shaft 2 and is provided with an exciting winding 5 connected to the slip rings 6, 7, usually carried by the shaft 2. These slips rings are connected by means of stationary brushes with the brushes 24, 25 of the direct current exciter, the armature 8 of which is carried by the shaft 2. The field structure 9 of this exciter carries the windings 38, 39 and 40, the last of which is connected to the brushes 24, 25 by way of the adjustable resistance 41. Keyed to the same shaft 2 is the armature of a two-pole rotary converter. This armature is provided with a commuted winding 17 with which coöperate two sets of brushes displaced by 90 electrical degrees. The brushes 22, 23, forming one set, are connected to the unidirectional exciting winding 18 displaced by 90 electrical degrees from the brush axis, and also to the winding 38 on the field structure 9 of the exciter. An adjustable resistance 62 is included in circuit with the winding 38. The brushes 34, 35, which form the other set, are connected in series with the windings 36 and 37 on the converter and the winding 39 on the field structure 9 of the exciter. The winding 36 is coaxial with the brush axis 34, 35. The winding 37 is displaced by 90 electrical degrees therefrom. The stator of the converter also carries two displaced damping windings, 19 and 20. The commuted winding 17 is connected at two diametrical points to the slip rings 15, 16. The armature 11 of a small auxiliary generator is keyed to the shaft 2 and coöperates with the field structure 12, which carries an exciting winding 13 connected between one terminal of the synchronous alternator and the main 59. The armature 11 is provided with a commuted winding with which coöperate the stationary brushes 26, 27 displaced by 90 electrical degrees from the axis of the exciting winding 13 and connected to the slip rings 15, 16 through the neutralizing winding 14 the axis of which coincides with the brush axis 26, 27 and which is designed to oppose the armature reaction of the auxiliary generator.

The operation of the embodiment of the invention shown in Fig. 1, is somewhat as follows: Assuming the circuit of the winding 38 to be interrupted at 62, then upon the synchronous generator being brought up to speed, its terminal voltage $e$ can be adjusted to the desired value by means of the resistance 41. As long as the load current $i$ is zero, the excitation of the generator will only depend on the current in the exciting winding 40 of the exciter. As soon as the alternator is loaded, an E. M. F. $e'$ will appear at the terminals of the auxiliary generator 11, 12. This E. M. F. will, under all circumstances, be in phase with the load current. When that load current is in phase with the terminal voltage $e$, then $e'$ will be in phase with $e$. When the phase of $i$ differs from $e$, then the phase $e'$ will differ from $e$ by the same amount. The connections are such that this E. M. F. $e'$ is impressed on the alternate current side of the positively driven converter armature 17. Under these conditions the magnitude of the direct current voltage appearing at the brushes 22, 23, or at the brushes 34, 35 will entirely depend on the phase of $e'$. If the phase of this "load current E. M. F." is such that it reaches its maximum when the points at which the slip rings 15, 16 connected to the winding 17 coincide with the brushes 22, 23, then the direct current voltage at these brushes will be a maximum and the direct current voltage at the brushes 34, 35 will be zero. For a phase displacement of $e'$ amounting to 90 degrees, the condition will be reversed, no direct current voltage appearing at the brushes 22, 23, and the maximum direct current voltage corresponding to the value of $e'$ appearing at the brushes 34, 35. Now according to this invention I so connect the slip rings 15, 16 to the commuted winding 17, or when the slip rings are already connected to 17, I so move the brush gear as a whole, preferably together with the stator, as to reduce the direct current voltage at the brushes 34, 35 to zero when the phase of $e'$ coincides with the phase of $e$, in other words, when the generator operates on a unity power factor load. For a unity power factor load the full direct-current voltage corresponding to the value of $e'$ will then appear at the brushes 22, 23. These brushes being connected to the unidirectional exciting winding 18, the latter will provide the unidirectional excitation necessary to reduce the alternating current taken by the converter at no-load to a small value. The direct current voltage appearing at the brushes 22, 23 will, under these circumstances, be strictly proportional to the "load current E. M. F." and therefore also to the load current. This voltage may therefore be made use of to compound the alternator. This is for instance achieved by closing the circuit of the exciting winding 38 and suitably adjusting the resistance 62. As soon as the phase of the load current, and therefore the phase of $e'$, changes, then a direct current voltage appears at the brushes 34, 35, and a direct current is sent through the windings 36, 37 of the converter and the winding 39 of the exciter. The voltage at the brushes 34, 35 is always proportional to the sine of the phase angle between the load current and the terminal voltage of the synchronous alternator. When the current begins to lag behind the terminal voltage, then the direction of the E. M. F. appearing at the brushes 34, 35 is such as to cause the winding 39 to add to the magnetization of the exciter. As soon as the load current begins to lead the terminal E. M. F., the direction of the E. M. F. at the brushes 34, 35 changes and produces a demagnetizing effect on the exciter. This action corresponds exactly to the actual requirements of the machine. Referring to Fig. 2 if OF represents the direction of the unidirectional magnetization in the synchronous generator, then OA shows the direction of the armature reaction for unity power factor load. It is seen that this reaction cannot have any direct effect on the magnitude of OF. It can only distort said field and reduce its magnitude by increasing the reluctance of the magnetic path. Should the power factor of the load change, causing the current to lag behind the terminal voltage by an angle $c'$, then the direction of the armature reaction will assume that of the vector OA'. The component $Oa'$ of this armature reaction will now act to directly oppose the magnetization OF while the distorting influence of the armature reaction will be reduced from OA to $a'A'$. Similarly if the current comes to lead the terminal E. M. F., by an angle $c''$, then the armature reaction will assume the position indicated by the vector OA'' and this armature reaction will have a component $Oa'$ which will add to the magnetization OF. Both $Oa'$ and $Oa''$ are proportional to the sine of the angle $c$ by which the phase of the load current differs from the phase of the terminal E. M. F., which shows that the magnitude of the E. M. F. appearing at the brushes 34, 35 is directly proportional to the vectors $Oa'$ or $Oa''$ of Fig. 2, and changes its direction together with these vectors, thus causing the excitation of the synchronous generator to vary strictly in accordance with the magnitude and the phase of the load current. As long as the E. M. F. at the brushes 34, 35 is zero, the windings 36, 37 of the converter are idle and the total unidirectional excitation of this machine is supplied by the winding 18. When the phase of $e'$ is caused to differ from that of $e$, then the magnitude of the direct current E. M. F. at the brushes 22, 23 diminishes, and that at the brushes 34, 35 increases. In consequence, the unidirectional magnetization produced by the winding 18 decreases and that produced by the windings 36 and 37 increases. In this way it is possible to keep the total unidirectional magnetization of the converter nearly constant. This is particularly true in case the winding 36 is omitted. The main object of this winding 36 is to influence the compounding of the synchronous alternator. It has already been pointed out that the voltage at the brushes 22, 23 diminishes as soon as the phase $e'$ differs from that of $e$. This means that the compounding effect of 38, which depends on the voltage at these brushes, also diminishes. By so connecting the winding 36 as to cause same to magnetize in the same direction as the winding 18 when $i$ lags behind $e$, the full compounding effect can be upheld for any lagging load, even though the magnetic densities in the field structure 9 of the exciter are under these same conditions increased because of the added magnetization of the winding 39. In case the current leads the terminal E. M. F., the winding 36 will oppose the magnetization of the winding 18 and reduce the magnetization produced by the winding 38 beyond the value to which it would be reduced if the winding 36 were omitted. But, with a leading current, the densities in the field structure 9 are much reduced, so that a smaller current in the winding 38 will be sufficient to produce the same compounding as for unity power factor or for lagging loads.

The essential features of the embodiment of the invention shown in Fig. 1, are, first, the production and utilization of a "load current E. M. F." the phase of which bears a constant relation to the phase of the load current, and second, the use of a mechanically-driven converter provided with a set of direct-current brushes and so connected to the load current E. M. F. that the difference of potential at the direct current brushes of the converter is zero irrespective of the value of the load current E. M. F., as long as the load current is in phase with the terminal E. M. F. This mechanical converter may also be provided with two sets of direct-current brushes displaced by 90 electrical degrees, the connection between this converter and the load current E. M. F. being so made that the direct-current voltage appearing at one set of brushes varies with the cosine of the phase angle $c$ between the load current and the terminal E. M. F., while the direct-current E. M. F. at the other set of brushes varies with the sine of said angle and is zero when the load current is in phase with the terminal E. M. F.

The arrangement shown in Fig. 1 so varies the exciting current of the synchronous machine there shown as to increase or decrease said current in accordance with the magnitude and direction of the coaxial reaction magnetization. But it does not take care of that component of the armature reaction which magnetizes along an axis displaced by 90 electrical degrees with respect to the exciting magnetization, with the result that the total magnetization of the machine varies with the load.

The arrangement shown in Fig. 3 is designed to neutralize the whole of the armature reaction and also indicates means for compounding such a machine. The stator of the two-pole single-phase alternate current generator or motor carries a winding 3 the terminals of which are connected to the mains 58, 59. The field structure 4 is keyed to the shaft 2 and carries two windings 5 and 64 displaced by 90 electrical degrees and each connected to a pair of slip rings 6, 7 and 65, 66, usually carried by the shaft 2. The winding 5 is an exciting, the winding 64 a neutralizing winding. This same shaft carries the armature 8 of a direct-current exciter the field structure 9 of which is provided with the windings 38, 39 and 40, the last of which is connected through the adjustable resistance 41 to the brushes 24, 25 coöperating with the armature 8. The armature of a rotary converter provided with the commuted winding 17 is keyed to the shaft 2 and coöperates with the two sets of brushes 22, 23 and 34, 35 displaced by 90 electrical degrees from each other and each connected to an exciting winding located on the stationary member of the converter. The brushes 22, 23 are connected to the winding 18, the brushes 34, 35 to the winding 37. This stationary member also carries two displaced and short circuited windings 19, 20. The brushes 34, 35 are connected to the winding 39 on the field structure 9 of the exciter through the adjustable resistance 67. The brushes 22, 23 are connected to the neutralizing winding 64 on the revolving member of the synchronous machine by way of the slip rings 65, 66 and through the winding 38 located on the field structure of the exciter the ampere turns of which winding can be regulated by means of the adjustable resistance 68. Two diametrically located points of the commuted winding 17 of the converter are connected to the slip rings 15, 16, carried by the shaft 2. This shaft further carries the armature of a small generator which is provided with the commuted winding 11 with which coöperate the stationary brushes 26, 27. The stator of this machine carries an exciting winding 13 connected between one terminal of the synchronous machine and the main 59, and a neutralizing winding 14 displaced from the exciting winding and coaxial with the brush axis. The brushes 26, 27 are connected to the slip rings 15, 16, in series with the neutralizing winding 14. The slip rings 15, 16 are so connected to the commuted winding 17 of the converter that, when the latter is revolved in synchronism with the field member 4 of the synchronous machine and the E. M. F. $e'$ generated in armature 11 is of the same phase as the terminal E. M. F. $e$ of the synchronous machine, the direct current voltage $d'$ appearing at the brushes 34, 35 of said converter, is zero while the direct current voltage $d''$ appearing at the brushes 22, 23, is a maximum. Since the phase of the E. M. F. $e'$ varies with the phase of the load current $i$ and coincides with that of $e$ when $i$ is in phase with $e$, then the direct-current E. M. F. $d'$ will always be proportional to $e'$ sine $c$ and the direct-current E. M. F. $d''$ will always be proportional to $e'$ cosine $c$, where $c$ is the phase angle between $e$ and the load current $i$ or between $e'$ and $e$.

The mode of operation of the arrangement shown in Fig. 3, as a generator, is somewhat as follows:

The synchronous generator being brought up to speed, the direct current exciter 8, 9 will excite itself and send an exciting current into the winding 5 of the field member of the synchronous generator sufficient to produce the no-load terminal E. M. F. As long as no load is taken from the generator, no E. M. F. will be generated in the armature 11 of the auxiliary machine and no E. M. F. will be impressed on the alternate current side of the converter. But, as soon as a load current $i$ is taken from the synchronous generator, then $e'$ will assume a certain magnitude proportional to $i$. Assuming that the winding 38 on the field structure 9 of the exciter is short circuited and that the current taken from the generator is in phase with its terminal voltage $e$, then the direct current voltage $d'$ of the converter will be zero and its direct current voltage $d''$ will be a maximum and proportional to $e'$, which means that a certain current proportional to $e'$ will flow through the neutralizing winding 64 of the synchronous generator. This winding is so proportioned that, under the conditions named, the magnetization it produces equals that of the armature reaction, which, for unity power factor, will appear along an axis displaced by 90 electrical degrees from the axis of the exciting winding 5 and therefore coinciding with the axis of the neutralizing winding 64. Should the phase of the load current now change and, for instance, come to lag behind the terminal E. M. F., then the axis of the armature reaction will immediately change its position with respect to the axis of the exciting winding 5. One component of this armature reaction proportional to the sine of the phase angle between $i$ and $e$ will appear along the axis of 5, and another component of this reaction proportional to the cosine of this phase angle will appear along the axis of the neutralizing winding 64. An exactly corresponding change will take place in the converter. The magnitude of $e'$ always corresponds to the magnitude of the load current and therefore of the total armature reaction; but the magnitudes of $d'$ and $d''$ change with the phase angle between $i$ and $e$. When that phase angle is zero and all of the armature reaction appears along the axis of the winding 64, then $d''$ is at a maximum and $d'$ is zero. When the phase angle between $i$ and $e$ changes and part of the armature reaction appears along the axis of the winding 5 while the remainder still acts along the axis of the winding 64, then the magnitude of $d'$ increases by an amount exactly proportional to the reaction appearing along the axis of 5, and $d''$ decreases by an amount exactly proportional to the decrease of the armature reaction in that axis. The winding 39 is so connected to the brushes 34, 35, and therefore to the direct-current E. M. F. $d'$ as to increase the excitation of the exciter 8, 9 for lagging current and to decrease it for leading current, thus causing the current in 5 to change in accordance with the magnitude and direction of the reaction component appearing in that axis. Should it be desired to compound the alternator, then the winding 38 on the field structure of the exciter may be included in circuit with the neutralizing winding 64 of the synchronous generator and the resistance 68 adjusted to produce the desired compounding at, say, unity power factor. As soon as the power factor changes, this compounding will diminish, and this diminution can be counterbalanced, at least for lagging loads, by providing the winding 38 with more turns than would be needed in order to take care of the armature reaction component which appears along the axis of the exciting winding 5 of the synchronous generator.

Instead of connecting the converter voltage $d'$ to an exciting winding on the exciter 8, 9, this voltage can be connected to an additional winding located on the field structure 4 of the synchronous generator and coaxially disposed with the exciting winding 5. Similarly, the converter voltage $d''$ need not be connected directly to the neutralizing winding 64, but may be connected to the exciting winding of a second exciter the armature of which should then be connected to the neutralizing winding 64. If the converter is connected directly to the windings located on the field structure 4, then its output must necessarily be much larger than if it is connected to the exciting windings located on the field structures of exciters which supply current to the field structure 4. The mode of operation is exactly the same in either case. In one instance the converter acts on the field structure of the synchronous generator directly, in the other it does so indirectly through the medium of one or more direct-current generators.

Having fully described my invention, what I claim as new and desire to secure by Letters Patent of the United States is:

1. The combination of an alternating current dynamo electric machine, a rotary converter mechanically connected thereto, and means for supplying to the alternating current side of the converter an E. M. F. having a constant phase relation to the load current of the dynamo electric machine.

2. The combination of a dynamo electric machine provided with an exciting winding, and means for producing a direct current E. M. F. varying as the sine of the phase angle between the terminal E. M. F. and the load current of the dynamo electric machine and utilizing said E. M. F. to vary the excitation of the dynamo electric machine.

3. The combination of a dynamo electric machine provided with a neutralizing winding, and means for producing a direct current E. M. F. varying as the cosine of the phase angle between the terminal E. M. F. and the load current of the dynamo electric machine and impressing said E. M. F. on the neutralizing winding.

4. The combination of dynamo electric machine provided with an exciting winding and a neutralizing winding, means for producing a direct current E. M. F. varying as sine of the phase angle between the terminal E. M. F. and the load current of the dynamo electric machine and utilizing said E. M. F. to vary the excitation of the dynamo electric machine, and means for producing a second direct current E. M. F. varying as the cosine of the phase angle between the terminal E. M. F. and the load current of the dynamo electric machine and impressing said second direct current E. M. F. on the neutralizing winding.

5. The combination of an alternating current dynamo electric machine having an exciting winding, a rotary converter, means mechanically driving the converter in synchronism with the dynamo electric machine, means for impressing on the alternating current side of the converter an alternating current E. M. F. having a constant phase relation to the load current of the dynamo electric machine and of same frequency as said load current, and means for utilizing current from the direct current side of the converter to neutralize that component of the armature reaction of the dynamo electric machine which is coaxial with the exciting winding.

6. The combination of an alternating current dynamo electric machine having an exciting winding, a rotary converter, means for impressing on the alternating current side of the converter an alternating current E. M. F. having a constant phase relation to the load current of the dynamo electric machine, means for utilizing current from the direct current side of the converter to neutralize that component of the armature reaction which is coaxial with the exciting winding, and means for utilizing current from the direct current side of the converter for neutralizing that component of the armature reaction which is displaced by 90 electrical degrees from the axis of the exciting winding.

7. The combination of an alternating current dynamo electric machine having an exciting winding, a rotary converter, means for impressing on the alternating current side of the converter an alternating current E. M. F. having a constant phase relation with the load current of the dynamo electric machine, and means for utilizing current from the direct current side of the converter to neutralize that component of the armature reaction which is displaced by 90 electrical degrees from the axis of the exciting winding.

8. The combination of an alternating current dynamo electric machine provided with an exciting winding, a rotary converter mechanically driven in synchronism with the dynamo electric machine, means for impressing on the alternating current side of the converter an alternating current E. M. F. varying in phase with the load current of the dynamo electric machine, and means for utilizing current from the direct current side of the converter to neutralize that component of the armature reaction of the dynamo electric machine which is displaced by 90 electrical degrees from the exciting winding.

9. The combination of an alternating current dynamo electric machine provided with an exciting winding, a direct current exciting dynamo in circuit with the exciting winding, a rotary converter mechanically driven in synchronism with the dynamo electric machine, means for supplying to the alternating current side of the converter an E. M. F. varying in phase with the load current of the dynamo electric machine, and means for utilizing current derived from the direct current side of the converter to vary the excitation of the direct current exciting dynamo.

10. The combination of an alternating current dynamo electric machine provided with an exciting winding, a direct current exciting dynamo in circuit with the exciting winding, a rotary converter mechanically driven in synchronism with the dynamo electric machine, an auxiliary alternating current generator having its field winding in series relation with the dynamo electric machine, means connecting said alternating current generator in circuit with the alternating current side of the converter, and means for utilizing current derived from the direct current side of the converter to vary the excitation of the direct current exciting dynamo.

11. The combination of an alternating current dynamo electric machine provided with an exciting winding and a neutralizing winding, an auxiliary alternating current generator having its field winding connected in series relation with the dynamo electric machine, a rotary converter having its alternating current side connected to the auxiliary generator, means for mechanically driving the said rotary converter in synchronism with the dynamo electric machine, means connecting the direct current side of the converter in series relation with the neutralizing winding of the dynamo electric machine, and means for utilizing current from the direct current side of the converter to vary the excitation of the dynamo electric machine.

12. The combination of an alternating current dynamo electric machine provided with an exciting winding, a direct current exciting dynamo in circuit with said winding, an auxiliary alternating current generator having its field winding in series with the alternating current dynamo electric machine, a rotary converter having its alternating current side connected to the auxiliary generator, said dynamo electric machine, auxiliary generator, rotary converter and direct current exciting dynamo having their rotating members all mechanically interconnected, and means for utilizing current from the direct current side of the converter for neutralizing the armature reaction of the dynamo electric machine.

In testimony whereof I have hereunto set my hand and affixed my seal.

VALÈRE A. FYNN. [L. S.]